United States Patent [19]

Hill

[11] 3,904,152
[45] Sept. 9, 1975

[54] VARIABLE AREA, VARIABLE CAMBER WING FOR AIRCRAFT

[75] Inventor: T. Gardner Hill, Atlanta, Ga.

[73] Assignee: Lockheed Aircraft Corporation, Burbank, Calif.

[22] Filed: Mar. 13, 1974

[21] Appl. No.: 450,668

[52] U.S. Cl.............. 244/43; 244/42 DA; 244/44
[51] Int. Cl.². ............................................ B64C 3/54
[58] Field of Search......... 244/43, 44, 42 D, 42 DA, 244/42 DB, 42 DC, 12 B; 416/23, 24

[56] References Cited
UNITED STATES PATENTS

| | | | |
|---|---|---|---|
| 1,301,196 | 4/1919 | Thompson | 244/43 |
| 2,191,840 | 2/1940 | Zap | 244/42 D |
| 2,222,935 | 11/1940 | Chilton | 244/43 |
| 2,231,226 | 2/1941 | Schwarzmayr | 244/43 |
| 2,350,809 | 6/1944 | Pelessoni | 244/43 |
| 3,083,935 | 4/1963 | Piasecki | 244/12 B |
| 3,706,431 | 12/1972 | Smith | 244/42 DA |

FOREIGN PATENTS OR APPLICATIONS

| | | | |
|---|---|---|---|
| 644,206 | 10/1950 | United Kingdom | 244/44 |
| 265,724 | 5/1933 | Italy | 244/43 |
| 389,139 | 7/1924 | Germany | 244/42 DB |

Primary Examiner—Trygve M. Blix
Assistant Examiner—Galen L. Barefoot
Attorney, Agent, or Firm—Billy G. Corber; John J. Sullivan

[57] ABSTRACT

A mechanism is provided for both extending the chord of a wing by more than seventy percent and for increasing the camber of the wing without creating the high pitching moment characteristics of conventional high lift wing systems. These advantageous capabilities are accomplished by constructing forward and aft wing sections which cover the wing box beam and form a high wing loading cruise flight wing. The sections can be extended and deflected to uncover the wing box beam and form a greatly increased area to lower the wing loading and an increased camber with low pitching moment to provide high lift for short take-off and landing.

10 Claims, 6 Drawing Figures

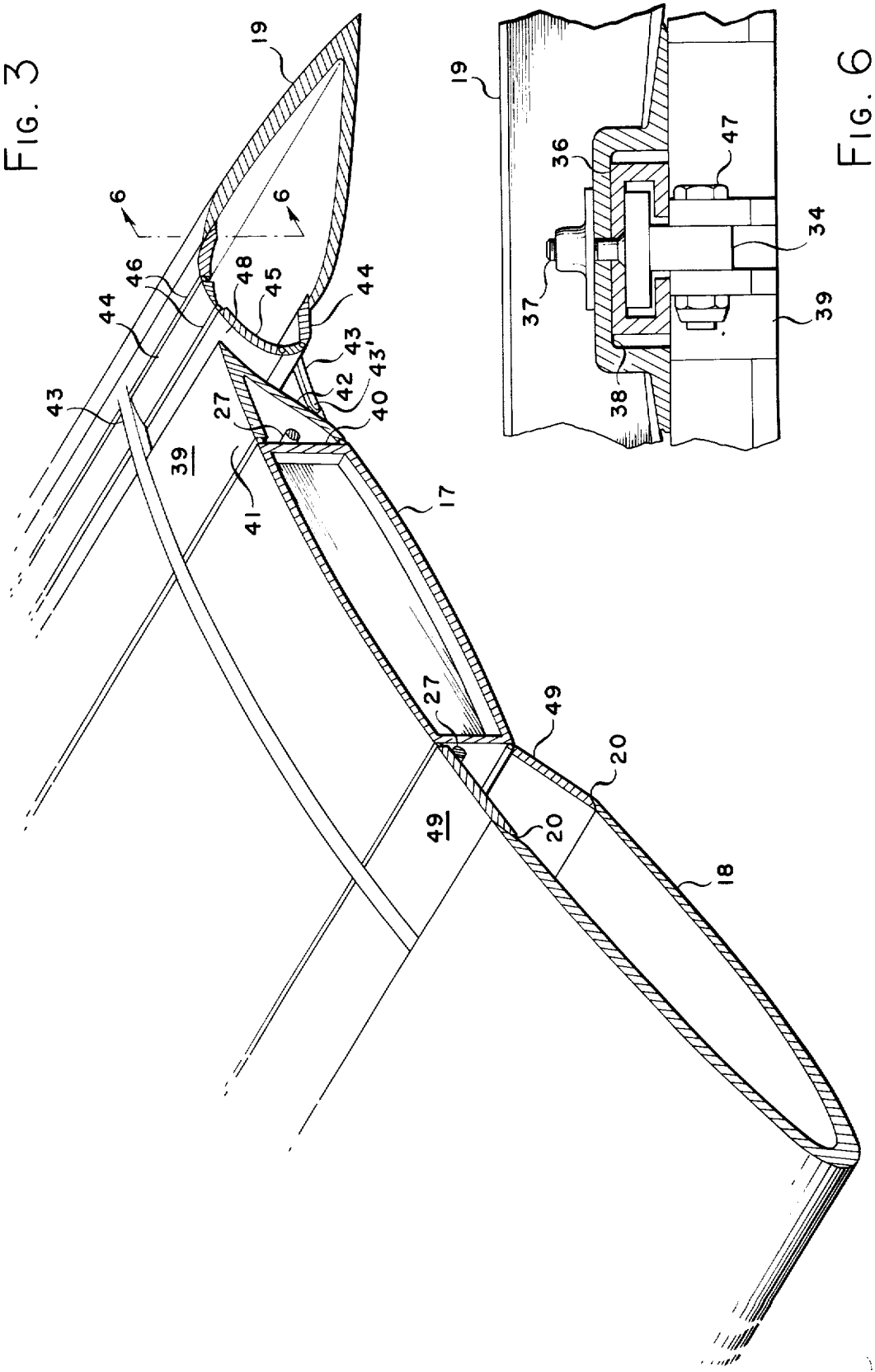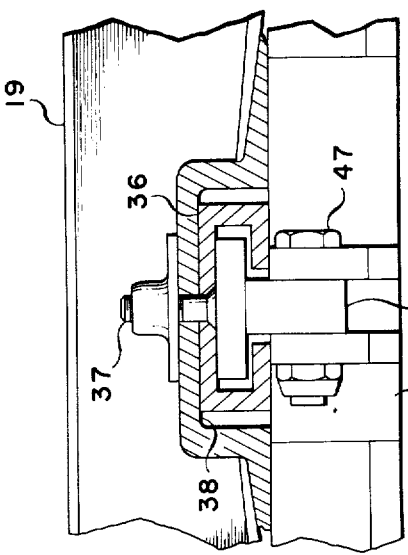

VARIABLE AREA, VARIABLE CAMBER WING FOR AIRCRAFT

This invention relates to high lift airfoils for aircraft and more particularly to such an airfoil or wing having variable area and variable camber to thereby permit a substantial reduction in wing loading without any large change in pitching moment. The present airfoil is especially adapted for shortening take-off and landing (STOL) distance for high performance aircraft.

In order to provide efficient STOL performance in conjunction with efficient cruise performance, it is most desirable that the wing profile of an aircraft be provided large wing area change in conjunction with large camber change over the entire wing chord. Heretofore, this has been sought through the use of leading and trailing edge flaps which when deflected provide a modest area increase and a camber change in the leading and trailing edge areas but no camber change over the wing box beam area. In an effort to obtain maximum reduction in wing loading, portions of the wing box beam structure have been sacrificed to maximize the extensible area causing a degradation of the wing structural efficiency. In any event, these prior designs inevitably cause large changes in pitching moment of the aircraft, adversely affecting overall operation of the aircraft.

The present invention is, therefore, directed toward improvements in wing design whereby both the wing area change and the camber change are greatly increased in magnitude and the pitching moment is concurrently greatly decreased. The design herein proposed is such that a wing chord extension exceeding 70 percent is realized giving a high wing loading for cruise and a low wing loading for take-off and landing.

In addition, as herein proposed the proportioning of the total extension is such that the center of lift remains in substantially the same position for the extreme positions corresponding to cruise and high lift conditions, resulting in more than an 80 percent reduction in the pitching moment coefficient. This considerably reduces wing box torsion, negative tail lift and horizontal tail requirements. Among other things, the wing box shaping becomes flexible (upper and lower surfaces can have simple radial curvature and spars can be located freely) with simple box construction. Leading and trailing edge air loads can be reacted in the pylons at generous moment arms reducing concentrated loads and delivering only distributed loads to the wing box.

Incidentally, with its large radius upper surface, the instant airfoil design lends itself well for over-the-wing blowing in the event that power lift augmentation is desired.

More specifically, this airfoil or wing is formed by a central, spanwise box beam over the top and bottom of which leading and trailing edge sections slide. These sections are adapted to abut at a predetermined chordwise location to define the airfoil profile of the cruise wing. Each section is comprised of multiple spanwise segments provided with chordwise edges which engage and coact with complementary stationary edges secured to the box beam whereby interconnected drive mechanisms force each section outwardly of the box beam in unison to establish the airfoil profile of the high lift wing. The curvature of the chordwise complementary edges effects the desired deflection of both the leading and the trailing edge sections for take-off. A supplemental drive is provided for the trailing edge section to effect an additional deflection thereof for landing as well as for low speed roll control and glide path correction.

With the above and other objects in view as will become apparent, this invention consists in the construction, combination and arrangement of parts all as hereinafter more fully described, claimed and illustrated in the accompanying drawings, wherein:

FIG. 1 is a plan view of the forward half of an airplane fuselage and one symmetrical wing to show primarily the planform of each wing constructed in accordance with the teachings of this invention, the two extreme conditions of the wing corresponding to cruise and high lift being shown in solid and phantom lines respectively, it being understood that the depicted constant chord, no sweep wing planform is just one planform to which this invention may be adapted;

FIG. 3 is a view similar to FIG. 2 showing the leading and trailing edge sections fully extended to uncover the center box beam and project therefrom in defining the wing profile in the high lift condition;

Figure 1:
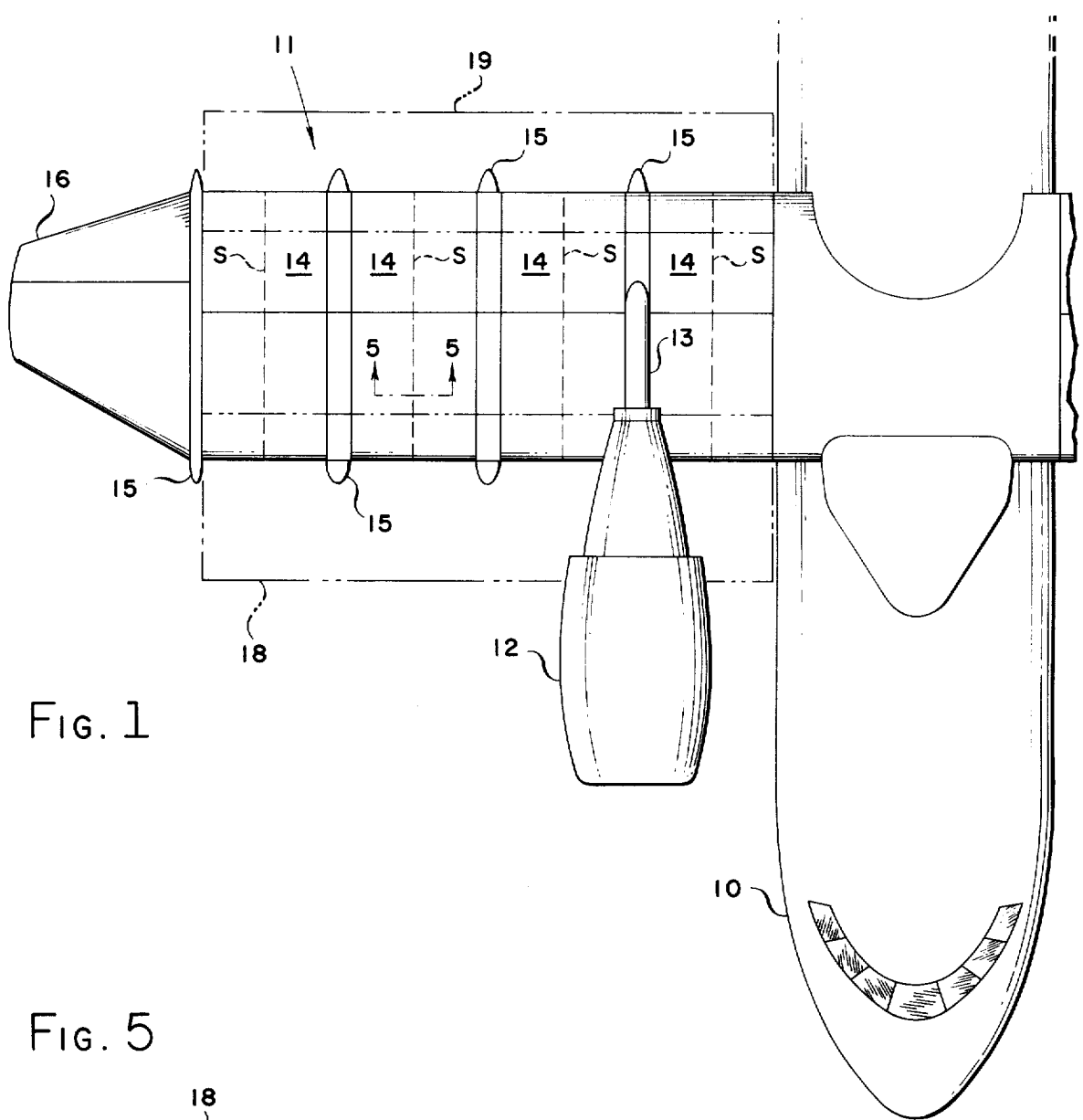
Figure 5:
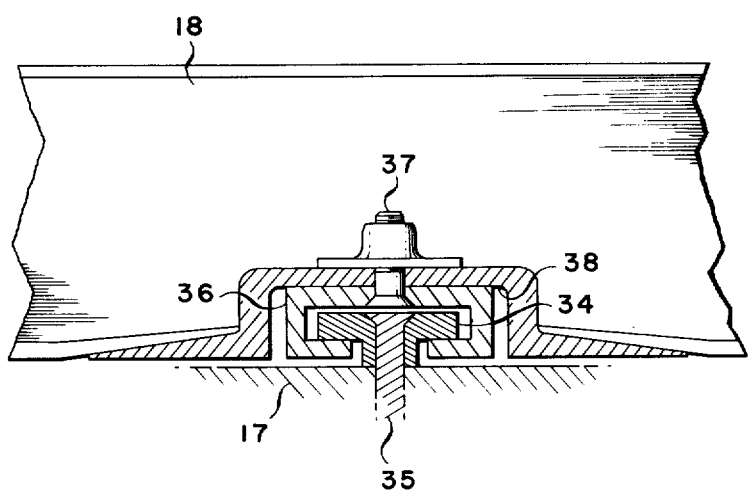

FIG. 5 is a section taken along the line 5—5 of FIG. 1 to show an intersupport/engagement between each wing segment and the underlying center box beam, one such intersupport/engagement being provided between each of the adjacent support islands; and FIG. 6 is a section taken along the line 6—6 of FIG. 3 to show the joining of the hinged closure panel to the upper wall of the trailing edge section of the wing to give its upper surface continuity with the upper surface of the rear spar of the center box beam.

Referring more particularly to the drawings, 10 designates a typical airplane fuselage to which a wing 11 is attached on each side in conventional manner. An engine 12 is mounted on the outer end of a pylon 13 secured to and projecting upwardly from the upper surface of each wing 11.

The depicted wing 11 is selected to be rectangular in shape for simplicity of illustration, comprising a plurality of segments 14 which are connected one with the next at and along the wing chord by means of and through a support island 15. Outboard each wing 11 may terminate in a tapered tip 16 mounted to and extending from an underlying internal center box beam 17.

Each center box beam 17 extends spanwise of its wing 11 with the inboard end appropriately mounted to the fuselage 10 and the several support islands 15 are all secured to the beam 17. The wing surfaces between islands 15 are established by the upper and lower surfaces of the segments 14 which enclose the beam 17.

Each wing segment 14 is made up of two sections, a forward or leading edge section 18 and an aft or trailing edge section 19 which overlap and abut one another as at 20 at and along their adjacent marginal edges when disposed in the fully retracted position corresponding to the high speed or cruise condition of the aircraft. The location of the overlaps 20 is selected so that the center of lift of the fully extended wing will be substantially the same as that of the fully retracted wing. This serves to eliminate most of the large pitching moment increase associated with conventional high lift wings in the take-off and landing modes.

Figure 2:
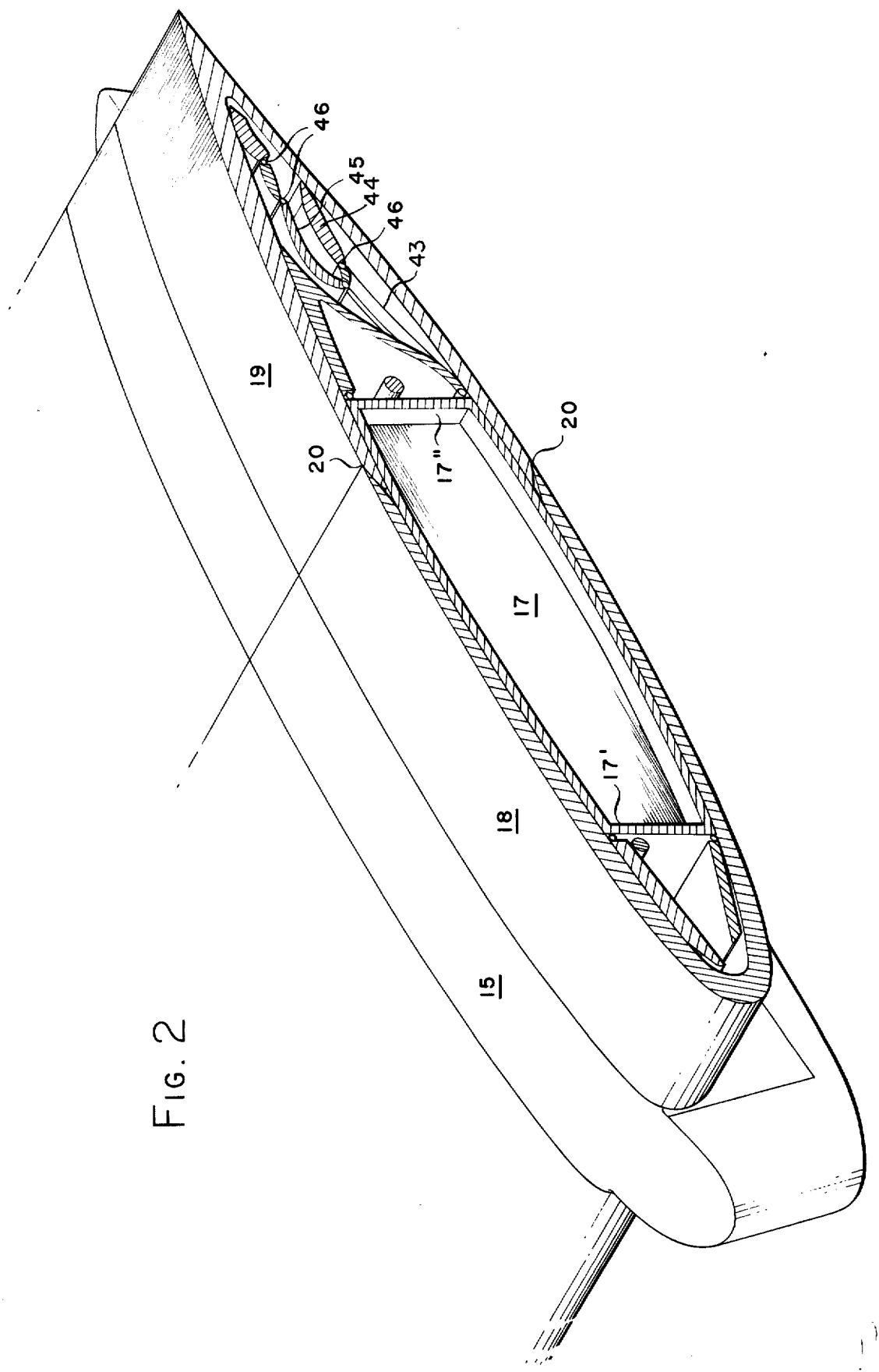
FIG. 2 is a top isometric view showing a transverse section of the wing of FIG. 1 with the leading and trailing edge sections fully retracted to enclose the center box beam and defining the wing profile during cruise.
Figure 4:
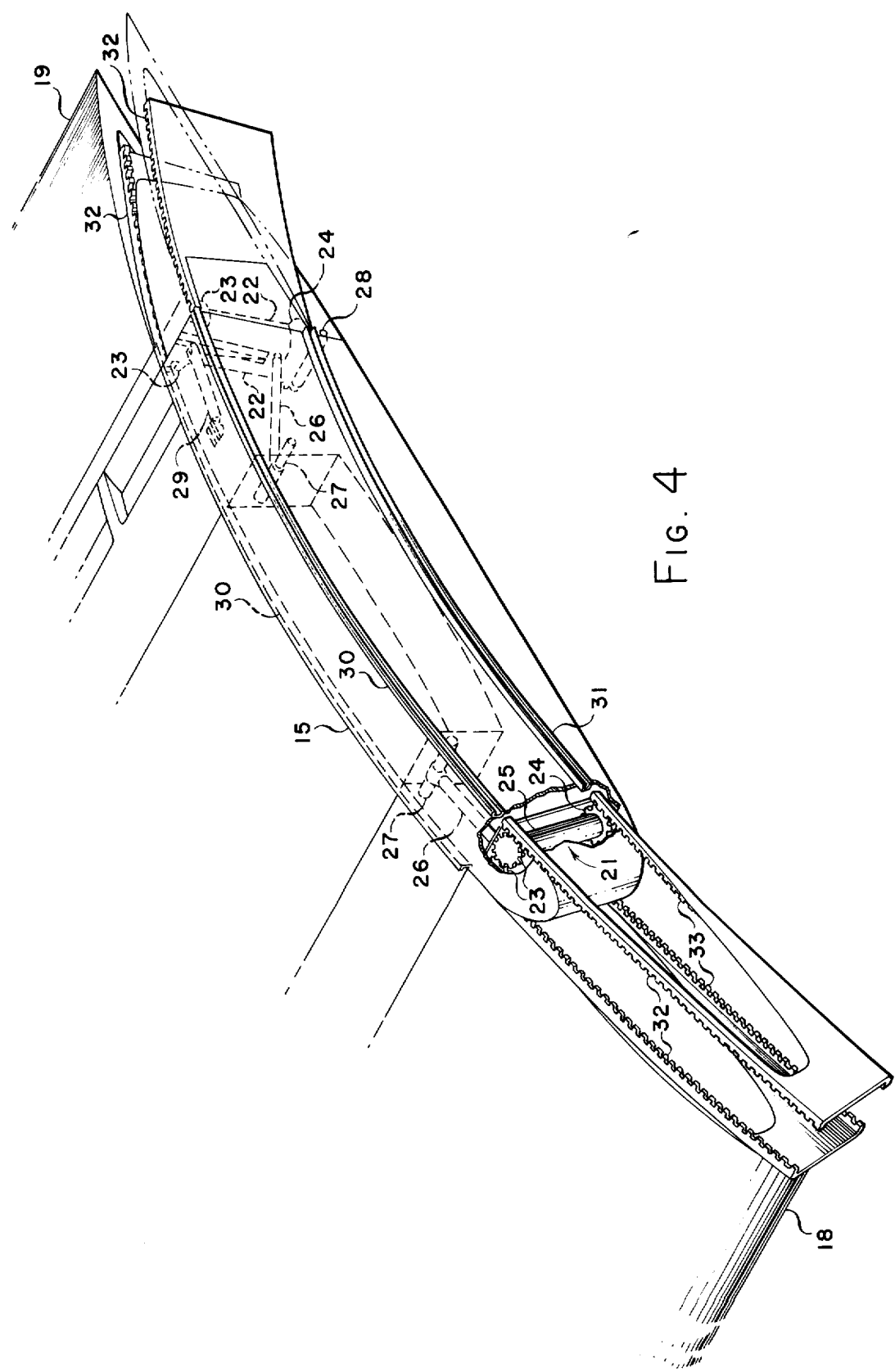
FIG. 4 is a view similar to FIGS. 2 and 3 showing the support island for each segment of the wing sections in which is housed the actuation mechanism by which the several segments are driven in unison to effect retraction and extension of the leading and trailing edge sections.

The leading and trailing edge sections 18 and 19 are designed and adapted to slide over the beam 17 thereby varying the wing chord length between the minimum shown in FIG. 2 for high speed/cruise and the maximum shown in FIG. 3 for high lift at take-off and landing. The rate of curvature of the upper and lower surfaces of the sections 18 and 19 is selected to establish the camber of the wing 11 in the cruise condition. The wing box beam 17 is defined by upper and lower sides having exterior surfaces with relatively large rates of curvature. The exterior, upper surfaces of leading and trailing edge sections 18 and 19 in the area adapted to overlie the beam 17 each have a rate of curvature that is less than that of the upper side surface of beam 17, effected by tapering the wall thickness of the sections 18 and 19 from a maximum toward their remote extremities to a minimum toward their adjacent overlapping edges 20. Thus, as the leading and trailing edge sections are extended they have the effect of increasing the camber of the wing 11 in the area of the beam 17.

A forward power actuator 21 is associated with each leading edge section 18 and an aft power actuator 22 is associated with each trailing edge section 19. Each actuator 21 and 22 is secured to an island support 15 and may comprise a pair of upper spur gears 23 and a pair of lower spur gears 24 interconnected by torque tubes 25 for the rotation of both gears 23 and 24 in unison. A drive shaft 26 serves to rotate each torque tube 25, the several shafts 26 being interconnected one with the next and to an appropriate power means through the spanwise drive shaft 27.

Each aft actuator 22 is connected adjacent its lower end to a rotatable trunnion 28 or the like carried by its associated island support 15. Adjacent its upper end each aft actuator 22 is pivotally connected to one end of drive means, such as for example a hydraulic cylinder 29 the other end of which is secured to fixed structure of the island support 15. Thus, the several trailing edge sections 19 may be swung from the take-off position to an increased downward deflection for landing. This actuation may also be used for quick deflection changes of the trailing edge sections to provide glide path control and low speed roll control of the aircraft 10.

As stated above each island support 15 is attached to the center box beam 17. Within the structure of each support 15 is a pair of tracks 30 and 31 complemental to and which encase corresponding upper and lower gear tooth racks 32 and 33 on the side edges of each of the leading and trailing wing sections 18 and 19. These tracks 30 and 31 and tracks 32 and 33 have a rate of curvature substantially the same as that of the upper side surface of beam 17 and serve to support and guide the wing sections 18 and 19. The racks 32 and 33 extend into and intermesh with the spur gears 23 and 24 respectively by which the sections 18 and 19 are actuated.

In order to supplement the foregoing, engagement between the wing segments 14 and the islands 15 in supporting the upper wall of wing sections 18 and 19 on intermediate chordwise support, indicated generally by a broken line S in FIG. 1 and shown in detail in FIG. 5, is provided between each pair of adjacent islands 15. More specifically, a laterally projecting, T-shaped rail 34 is secured as at 35 to the upper wall of the beam 17 so as to extend the entire chordwise dimension thereof. A complemental channel member or members 36 are secured as at 37 to the adjacent upper wall of each wing section 18 and 19. The adjacent areas of the wing sections 18 and 19 are recessed as at 38 to accommodate such members 36 when overlying and engaging the rails 34 with the adjacent surfaces of the wing sections 18 and 19 in abutment with the corresponding surfaces of the beam 17. Thus, the wing sections 18 and 19 are retained on the beam 17 without being restricted against sliding so as to vary the length of the wing chord.

The leading and trailing edge sections 18 and 19 are made to slide beyond the extremities of the center box beam 17. This is accomplished by means of and through extension elements provided on the forward and aft ends of the beam 17. More specifically, at its aft end the beam 17 carries an extension 39 which for all intents and purposes is an integral part of the beam structure. The extension 39 is generally right triangular in section with the base side 40 being the aft end wall of the beam 17, the adjacent, right angular side 41 disposed with its outer surface in the plane of the upper beam surface and projecting therefrom, and the diagonal side 42 connecting the aft end of side 41 with the lower end of base side 40.

At spaced intervals along the length of the extension 39, i.e., spanwise of the wing 11, ribs 43 are provided which are integral with side 41 of extension 39 projecting aft from the upper side thereof and which are pivotally attached as at 43' to side 42 of extention 39. At its outer end each rib 43 is secured, in any conventional manner, to a spanwise slat 44 constituting one element of a closure panel 45 for the trailing edge section 19. The closure panel 45 consists of a plurality of such slats 44 each connected to the next by a hinge pivot 46 with the end slats 44 each being pivotally connected as at 47 to a T-shaped fitting (the full equivalent of the fitting 34 previously described for sliding engagement in the channel 36) carried by the trailing edge section 19 (FIG. 6). Thus, the closure panel 45 is allowed to fold, as shown in FIG. 2, when the trailing edge section 19 slides forward over the beam 17 to the fully retracted position. When the trailing edge section 19 is extended the closure panel 45 unfolds forming a generally arcuate wall for the section 19, as shown in FIG. 3, in spaced relation to the extension side 42 creating a channel 48. This channel 48 permits the flow of air from the lower surface of the wing 11 to the upper surface of the wing trailing edge section 19 for discharge at and along the aft end thereof.

Similar extension elements are provided on the forward end of the beam 17. These comprise a pair of closure plates 49 one hinged to the upper surface of the beam 17 and the other hinged to the lower surface of the beam 17. Each plate 49 is springloaded in the outward direction, i.e., away from each other, but restrained against movement by the overlying leading edge section 18. As the leading edge section 18 moves to the extended position, however, the plates 49 are allowed to move away from one another to fill the space between the aft edge of the section 18 and the beam 17. At their outer ends the plates 49 are each formed with an end corresponding to the forward end of the trailing edge sections 19 to form an overlap similar to 20, as described.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A variable area, variable camber wing for aircraft comprising a central, spanwise box beam, a leading and a trailing edge section disposed around the respective fore and aft ends of said box beam, and an engagement and drive mechanism between each of said leading and said trailing edge sections and said box beam for movement of said sections to and from extreme positions where the adjacent spanwise edges of said sections abut one another to thereby completely enclose said box beam and where the adjacent spanwise edges of said sections are remote from one another to thereby uncover said box beam and extend from opposite, chordwise ends thereof, each said engagement and drive mechanism including a connection at and along the upper and lower extremity of the associated section to thereby react the loads from said sections simultaneously at both top and bottom chordwise edges of said sections and to establish the path of movement of said sections to and from their extreme positions corresponding to the contour of said sections.

2. The wing of claim 1 wherein each said leading and trailing edge section includes multiple spanwise segments having chordwise edges which engage and coact with complementary stationary edges secured to said box beam and interconnecting mechanisms between said spanwise segments for the movement thereof in unison.

3. The wing of claim 1 wherein the upper surface of said box beam has a selected rate of curvature greater than that of the upper surface of each of said leading and trailing edge sections in the region thereof adapted to overlie said box beam as aforesaid.

4. The wing of claim 1 wherein said engagement and drive mechanism further includes tracks carried by said box beam complemental to gear tooth racks carried by said leading and trailing edge sections, spur gears secured to said box beam and operatively engaging said gear tooth racks, and a drive for the rotation of said spur gears.

5. The wing of claim 4 wherein said tracks and said gear tooth racks each have a rate of curvature substantially the same as that of the upper box beam surface aforesaid.

6. The wing of claim 1 including an extension on the aft end of said box beam, a rib projecting aft from the upper and lower sides of said extension at spaced intervals along the length thereof, and a closure panel at the forward end of said trailing edge section secured to the aft end of each said rib whereby movement of said trailing edge section to its extreme position uncovering said box beam aforesaid produces a channel for the passage of air from the under surface of said wing to the upper surface of said wing at and along the forward edge of said trailing edge section.

7. The wing of claim 1 wherein said engagement and drive mechanism includes at least one chordwise rail carried by and projecting outwardly from each upper and lower side of said box beam, and a complemental channel member carried by each leading and trailing edge section to receive and slidingly engage each said rail.

8. The wing of claim 1 including an extendible drive connected at opposite ends to the upper ends of said box beam and said trailing edge section and operative to deflect said trailing edge section downward relative to said beam.

9. The wing of claim 2 including chordwise support islands secured to and enclosing said box beam at and along the chordwise edges of each spanwise segment aforesaid.

10. The wing of claim 9 wherein said engagement and drive mechanisms includes at least one chordwise rail carried by and projecting outwardly from each upper and lower side of said box beam between each of the adjacent support islands aforesaid, and a complemental channel carried by each leading and trailing edge section to receive and slidingly engage each said rail.

* * * * *